Patented Apr. 3, 1951

2,547,520

UNITED STATES PATENT OFFICE 2,547,520

CHLORO PTERIDINE AND METHOD OF PREPARING THE SAME

James H. Boothe, Pearl River, N. Y., assignor to American Cyanamid Company, New York, N. Y., a corporation of Maine No Drawing. Original application July 27, 1946, Serial No. 686,716. Divided and this application July 2, 1948, Serial No. 36,800

3 Claims. (Cl. 260—251.5)

This invention relates to a new organic compound. More particularly, it relates to 2-amino-4-hydroxy-6-chloromethyl pteridine and method of preparation thereof.

In my co-pending application, Serial Number 686,716, filed July 27, 1946, I described the preparation of 6-halomethyl pteridines and the reaction of these compounds with para-aminobenzoylglutamic acid to produce pteroylglutamic acid. This application, which is a division thereof, describes and claims the 6-chloromethyl pteridine.

The new compound of the present invention, 2-amino-4-hydroxy-6-chloromethyl pteridine, is prepared by heating 2-amino-4-hydroxy-6-methyl-pteridine with a chlorinating agent such as sulfuryl chloride. The reaction can be carried out at a temperature of from about 50° C. to 150° C., preferably at the refluxing temperature of the chlorinating agent.

The 2-amino-4-hydroxy-6-methyl pteridine, used as an intermediate in the present application, is a known compound, its preparation having been described in recent chemical literature.

The reaction is usually carried out in the absence of water, since generally in the presence of water most chlorinating agents break down. The chlorinating agent is usually used as a solvent although other solvents can be used, such as ethylene glycol and the like. The new compound of the present invention can be prepared as follows. Parts are by weight.

5 parts of 2-amino-4-hydroxy-6-methyl pteridine was refluxed with 167 parts of sulfuryl chloride in a small amount of benzoyl peroxide catalyst for 5 hours. The sulfuryl chloride was evaporated off and the product containing 2-amino-4-hydroxy-6-chloromethyl pteridine was dried.

To the product obtained above was added one part of diethyl para-aminobenzoyl glutamate in 11 parts of ethylene glycol and the mixture heated for one hour at 100° C. to 110° C. The mixture was diluted with ethanol and the insoluble product washed with ethanol and ether and dried. After hydrolysis of the ester groups by the use of dilute sodium hydroxide solution, the product was examined and found to contain pteroylglutamic acid.

I claim:

1. A method of preparing 2-amino-4-hydroxy-6-chloromethyl pteridine which comprises heating 2-amino-4-hydroxy-6-methyl pteridine with sulfuryl chloride and recovering said product therefrom.

2. A method of preparing 2-amino-4-hydroxy-6-chloromethyl pteridine which comprises heating 2-amino-4-hydroxy-6-methyl pteridine with sulfuryl chloride at a temperature within the range of 50° C. to about 150° C. and recovering said product therefrom.

3. 2-amino-4-hydroxy-6-chloromethyl pteridine.

JAMES H. BOOTHE.

No references cited.